(12) United States Patent
Studeny

(10) Patent No.: US 12,139,068 B2
(45) Date of Patent: Nov. 12, 2024

(54) METHOD FOR GENERATING THE LIGHT FUNCTION OF A DIRECTION INDICATOR IN A MOTOR VEHICLE AND MOTOR VEHICLE FOR CARRYING OUT THE METHOD

(71) Applicant: Volkswagen Aktiengesellschaft, Wolfsburg (DE)

(72) Inventor: Christian Studeny, Schoeppenstedt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 46 days.

(21) Appl. No.: 18/204,701

(22) Filed: Jun. 1, 2023

(65) Prior Publication Data
US 2023/0391253 A1    Dec. 7, 2023

(30) Foreign Application Priority Data

Jun. 2, 2022  (EP) ...................................... 22176992

(51) Int. Cl.
*B60Q 1/34*    (2006.01)
*B60Q 1/04*    (2006.01)

(52) U.S. Cl.
CPC ............... *B60Q 1/346* (2013.01); *B60Q 1/04* (2013.01); *B60Q 2400/50* (2013.01)

(58) Field of Classification Search
CPC ....... B60Q 1/346; B60Q 1/04; B60Q 2400/50
See application file for complete search history.

(56) References Cited

U.S. PATENT DOCUMENTS

| | | | |
|---|---|---|---|
| 6,727,962 B2 * | 4/2004 | Adams .............. | G02F 1/133615 349/61 |
| 8,045,760 B2 | 10/2011 | Stam et al. | |
| 9,120,421 B2 | 9/2015 | Takahashi | |
| 9,310,057 B2 | 4/2016 | Helbig et al. | |
| 10,053,001 B1 * | 8/2018 | Nabbe ................... | B60Q 1/543 |
| 10,076,995 B2 * | 9/2018 | Son ........................ | B60Q 1/324 |
| 10,125,943 B2 | 11/2018 | Thiel et al. | |
| 10,217,361 B2 * | 2/2019 | Jung ...................... | B60Q 1/543 |
| 10,974,642 B2 * | 4/2021 | Boilevin ................ | B60Q 1/543 |
| 2005/0117364 A1 * | 6/2005 | Rennick ................ | B60Q 9/008 362/540 |
| 2009/0013922 A1 * | 1/2009 | Lin ......................... | B60Q 1/44 116/28 R |

(Continued)

FOREIGN PATENT DOCUMENTS

| | | |
|---|---|---|
| AT | 518343 A1 | 9/2017 |
| CN | 107719226 B | 8/2018 |

(Continued)

*Primary Examiner* — Chico A Foxx
(74) *Attorney, Agent, or Firm* — Muncy, Geissler, Olds & Lowe, P.C.

(57) ABSTRACT

A method for generating the light function of a direction indicator in a motor vehicle. The light function of the direction indicator is activated when the motor vehicle is in an operational state and an actuating element is actuated in the motor vehicle. In addition to the generation of the light function of the direction indicator, a ground light projection can be generated in the immediate vicinity of the motor vehicle. The ground light projection can be generated, for example, only when an ambient brightness of the motor vehicle falls below a certain limit value.

10 Claims, 8 Drawing Sheets

(56) References Cited

U.S. PATENT DOCUMENTS

| | | | |
|---|---|---|---|
| 2013/0335212 A1* | 12/2013 | Purks | B60Q 1/34 |
| | | | 340/465 |
| 2014/0218946 A1 | 8/2014 | Fritz | |
| 2015/0138797 A1* | 5/2015 | Salter | B60Q 9/00 |
| | | | 362/510 |
| 2017/0008445 A1* | 1/2017 | Roeckl | F21S 41/148 |
| 2017/0203685 A1* | 7/2017 | Hirai | B60Q 1/0023 |
| 2017/0259731 A1* | 9/2017 | Son | B60Q 1/48 |
| 2018/0004020 A1* | 1/2018 | Kunii | B60Q 1/38 |
| 2018/0118095 A1* | 5/2018 | Kunii | B60Q 1/08 |
| 2021/0274615 A1* | 9/2021 | Ghedin | H05B 47/175 |
| 2022/0341560 A1 | 10/2022 | Shibata | |

FOREIGN PATENT DOCUMENTS

| | | | |
|---|---|---|---|
| DE | 10319364 A1 | 12/2004 | |
| DE | 102010063713 A1 | 6/2012 | |
| DE | 102015204303 A1 | 9/2015 | |
| DE | 102014117837 A1 | 6/2016 | |
| DE | 102017223441 A1 | 6/2019 | |
| DE | 102018121094 A1 | 3/2020 | |
| DE | 102018217243 A1 | 4/2020 | |
| EP | 1762430 A1 | 3/2007 | |
| EP | 3178698 A1 * | 6/2017 | B60Q 1/22 |
| EP | 3222906 A1 | 9/2017 | |
| EP | 2626244 B1 | 4/2020 | |
| WO | WO2004076231 A2 | 9/2004 | |
| WO | WO2021049232 A1 | 3/2021 | |

\* cited by examiner

METHOD FOR GENERATING THE LIGHT FUNCTION OF A DIRECTION INDICATOR IN A MOTOR VEHICLE AND MOTOR VEHICLE FOR CARRYING OUT THE METHOD

This nonprovisional application claims priority under 35 U.S.C. § 119(a) to European Patent Application No. 22176992, which was filed in Europe on Jun. 2, 2022, and which is herein incorporated by reference.

BACKGROUND OF THE INVENTION

Field of the Invention

The present invention relates to a method for generating a light function of a direction indicator in a motor vehicle and to a motor vehicle for carrying out the method.

Description of the Background Art

A method and a motor vehicle have become known from DE 10 2017 223 441 A1 and also from AT 518343 A1.

Thus, DE 10 2017 223 441 A1 describes a light control device for the spatial delimitation of multiple light functions. At least one of the light functions is designed as a low beam, cornering light, or projection light for a motor vehicle. The light control device includes a light emission unit having a light source and a control unit for setting a light intensity and radiation characteristics of a light of the light emission unit. The control unit can control the light emission unit such that, depending on the light function, only a partial area of an illuminable area is illuminated, wherein one of the light functions is assigned to the partial area. The light of the light source can be assigned to different light functions by means of the light control. Multiple light functions can be projected thereby onto a roadway using a single headlight that has the light control device. A single headlight can thus be used to illuminate a roadway as well as simultaneously to project informative symbols, such as, e.g., turn arrows as part of the cornering light.

AT 518343 A1 describes a lighting apparatus for a motor vehicle, which has projection optics and light sources. Each light source associated with a projection optic contributes to a defined lighting function by generating a light segment. The light segments contributing to a defined lighting function in each case are projected by the corresponding projection optics in the form of a ground projection such that light segments that can be generated by adjacent projection optics are located directly next to one another, wherein each light source can be controlled independently of the other light sources. For example, a lighting function can be a cornering light, an auxiliary cornering light-ground projection, or an auxiliary flashing light-ground projection. The projection optics can comprise reflectors and/or light guides. By sequentially switching individual light segments, it is possible to create animated ground projections. For example, a yellow, sweeping direction indicator moves in a white ground projection of the cornering light, wherein if the direction indicator overlaps with segments of the cornering light, the segments are turned off.

SUMMARY OF THE INVENTION

It is therefore an object of the present invention to provide a method for generating the light function of a direction indicator, in which the visibility of a ground light projection generated in addition to the generation of the light function of the direction indicator is improved. A further object of the present invention is to provide a suitable motor vehicle for carrying out the method.

In an example of the invention, a method is provided for generating the light function of a direction indicator in a motor vehicle. In this regard, the light function of the direction indicator is activated when the motor vehicle is in an operational state and an actuating element is actuated in the motor vehicle. The actuating element can be designed, for example, as a turn signal lever arranged on the steering wheel column of the motor vehicle.

The operational state in an internal combustion engine can be understood to be the state in which the ignition has been turned on. In the case of an electric vehicle, this may be such a state in which a traction battery has been electrically connected to the vehicle's existing high-voltage network.

In the method, in addition to the generation of the light function of the direction indicator, a ground light projection can be generated in the immediate vicinity of the motor vehicle.

The ground can be a roadway, a street, or the ground surface of the motor vehicle. The term in the immediate vicinity of the motor vehicle may be intended to specify that the ground light projection is generated, for example, only at most a few meters away from the motor vehicle.

The ground light projection can be generated, for example, only when an ambient brightness of the motor vehicle falls below a certain limit value.

In this way, it can be ensured that the ground light projection, which is generated in addition to the light function of a direction indicator, can always be easily perceived if it is generated. This therefore ensures that the contrast between the surroundings and the ground light projection is as high as possible. Independently of this, the light function of a direction indicator is always generated when the actuating element is actuated if the motor vehicle is operational.

The limit value of the ambient brightness for generating the ground light projection can differ from a limit value of the ambient brightness for generating the light function of a cornering light.

In this way, greater flexibility in the adjustment of the method can be achieved. In particular, the ground light projection can be adjusted even more specifically to the ambient brightness.

It is very advantageous if the limit value for generating the ground light projection can correspond to a higher ambient brightness than the limit value for generating the light function of the cornering light. In other words, in this way, the ground light projection is usually generated even sooner than the light function of the cornering light. This contributes to an increase in road safety, as even minor changes in the vehicle's direction of travel, such as, for example, lane changes, can be recognized even earlier and better by road users.

The ground light projection can be a defined graphic pattern. The pattern can be formed by flat, light areas with a defined outline, which are spaced apart from one another by at least one dark area. Such patterns, which contain light and dark areas, exhibit strong gradients between the light/dark areas and are therefore generally easily perceptible compared to undefined illumination areas. Moreover, such patterns are very well distinguished from the cornering light, which is defined only in a prescribed beam angle, because it illuminates not only the ground (e.g., the road) but also areas farther away.

Simple patterns can be used, as these can be detected more quickly. For example, it is conceivable to have a pattern that includes a number of quarter circles or triangles. These can be arranged together in such a way that they represent a directional indication. It is also conceivable, however, that a pattern is formed of multiple (therefore, at least two) flat and light areas, which are formed elongated and curved or elongated and bent like arrows. This enumeration should not be considered exhaustive.

Further, when the light function of the cornering light and the ground light projection are generated simultaneously, the method proceeds such that the entire cornering light or at least one partial area of the cornering light, said area overlapping with the ground light projection, can be statically dimmed to a brightness value with a lower brightness. For example, it is also conceivable that the light function of the cornering light is generated by producing multiple light segments. Individual light segments can be generated here, for example, by corresponding projection optics, each of which is assigned to a light segment. If the cornering light is generated segment by segment, the entire area of the cornering light does not have to be dimmed, but only those light segments that overlap with the ground light projection need to be dimmed.

Nevertheless, it should be pointed out that dimming of the cornering light during a flashing cycle may only occur during the time when the light function of the direction indicator is currently in an "on" state and the ground light projection synchronized with this thus also illuminates at the same time. If, on the other hand, the light function of the direction indicator is currently in an "off" state and the ground light projection does not illuminate, then the cornering light does not necessarily have to be dimmed or remain dimmed and can also be increased to the maximum brightness value during this period.

Such an example contributes to the fact that in the case of the generation of the ground light projection, it can be better perceived despite the simultaneous generation of the light function of the cornering light. On the other hand, the generation of the light function of the cornering light does not have to be completely dispensed with.

It is also provided that when the light function of the cornering light and the ground light projection are generated simultaneously, at least one part of the cornering light, said part overlapping with the ground light projection, an be dimmed to a dimmed brightness value of lower brightness. In this example, this is done such that the dimmed brightness value is adjusted to the ambient brightness. By adjusting to the ambient brightness, dimming can be made even more effective. Thus, it is conceivable that the dimmed brightness value is higher at a higher ambient brightness (e.g., dusk) than at a lower ambient brightness (e.g., nightfall).

In other words, the cornering light then may shine brighter at dusk than at nightfall.

It is also conceivable that the ground light projection can be adapted to the ambient brightness. For example, the ground light projection may also be brighter in darkness (e.g., night) in inner city areas with street lighting than at a rural intersection.

The adjustment to ambient brightness can preferably occur in the following manner:

First of all, it is conceivable that the dimmed brightness value is continuously adapted to the ambient brightness, particularly preferably in real time. Therefore, a constant adaptation of the brightness value of the cornering light occurs, wherein the brightness value also increases with increasing ambient brightness and likewise decreases with decreasing ambient brightness.

In order to keep the control effort low, it is also conceivable, however, that the dimmed brightness value can be adapted to the ambient brightness such that when a first limit value of the ambient brightness is reached (e.g., at dusk), the brightness value is first set to a first value (for example, up to 80% of the maximum brightness) and then, when a second, lower limit value of the ambient brightness is reached (e.g., at nightfall), it is set to a second value (for example, up to 40% of the maximum brightness). The second dimmed brightness value is therefore lower than the first dimmed brightness value.

In other words, in this example, only a two-stage adaptation of the brightness value of the cornering light can take place, wherein the brightness of the cornering light is reduced stepwise (dimmed) with the decreasing ambient brightness.

To further improve the visibility of the ground light projection, the ground light projection can be dynamically built up from an initial state (e.g., an initial size or an initial shape) to a final state (e.g., final size or final shape). In this case, a brightness of the ground light projection can be increased continuously, starting from an initial value at the time of the initial state to a maximum of the brightness at the time of the final state.

Further, a motor vehicle for carrying out the method is also proposed by the present invention. In this regard, a motor vehicle with front and rear lighting devices is provided. The light function of a direction indicator can be generated by the lighting devices, wherein the light function of the direction indicator can be generated by actuating an actuating element. Further, a lighting device for generating the light function of a cornering light is provided.

The previously mentioned light functions can be realized by lighting devices in a housing. However, it is also conceivable that the individual light functions are realized by multiple lighting devices in separate housings.

The motor vehicle further can have at least one light sensor. The light sensor can be designed as a rain/light sensor, for example. The at least one light sensor is linked in terms of signaling to the lighting device for generating the light function of the cornering light. Furthermore, at least one device for generating a ground light projection is provided.

The aforementioned lighting devices and the device for generating a ground light projection can comprise different optical concepts. For example, reflectors, lenses, light guides, projection systems, and different light sources can be used. A mixture of these optical concepts is also conceivable.

The motor vehicle can now be characterized in that the device for generating a ground light projection is likewise connected in terms of signaling to at least one light sensor. The at least one light sensor can preferably be the same light sensor to which the lighting device for generating the light function of the cornering light is also linked in terms of signaling. Furthermore, a control and evaluation device for evaluating signals from the at least one light sensor is provided.

The control and evaluation device can be used to control both the device for generating the ground light projection and the lighting device for generating the light function of a cornering light as a function of the signals from the at least one light sensor.

Based on these features, the conditions are created that the motor vehicle is suitable for carrying out the method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1a is the representation of a motor vehicle from a bird's-eye view with its cornering lights turned on;

FIG. 1b is the representation of the motor vehicle from the bird's eye view, with a direction indicator turned on and with a ground light projection turned on;

DETAILED DESCRIPTION

Figure 1A:
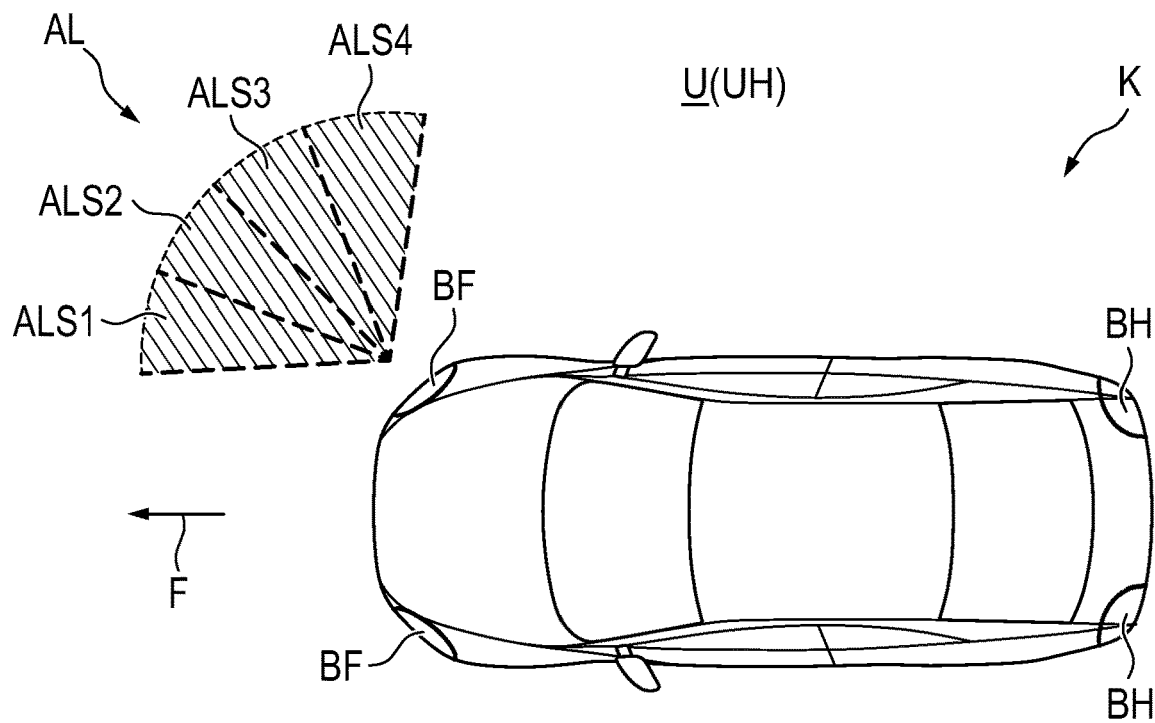

FIG. 1a shows a motor vehicle K for carrying out the method. Motor vehicle K has front lighting devices BF and rear lighting devices BH. The front lighting devices BF can be designed as headlights, for example, whereas the rear lighting devices BH can be designed as taillights. Motor vehicle K travels in a usual direction of travel F, therefore, forward.

The surroundings of motor vehicle K are labeled with U, wherein the surroundings U have a certain ambient brightness UH.

A state is shown in the figure in which a cornering light AL has been activated. Cornering light AL can be formed of a number of segments. In the exemplary embodiment, cornering light AL has four segments ALS1 to ALS4. It is also conceivable, however, that the cornering light is not divided or dividable into multiple segments.

As is known, a cornering light is activated when a steering wheel of a motor vehicle K exceeds a certain steering angle and/or when an actuating element for a direction indicator (for example, the turn signal lever on the steering column) has been actuated. In addition, a speed of motor vehicle K must fall below a certain limit value (for example, 40 km/h).

Figure 1B:
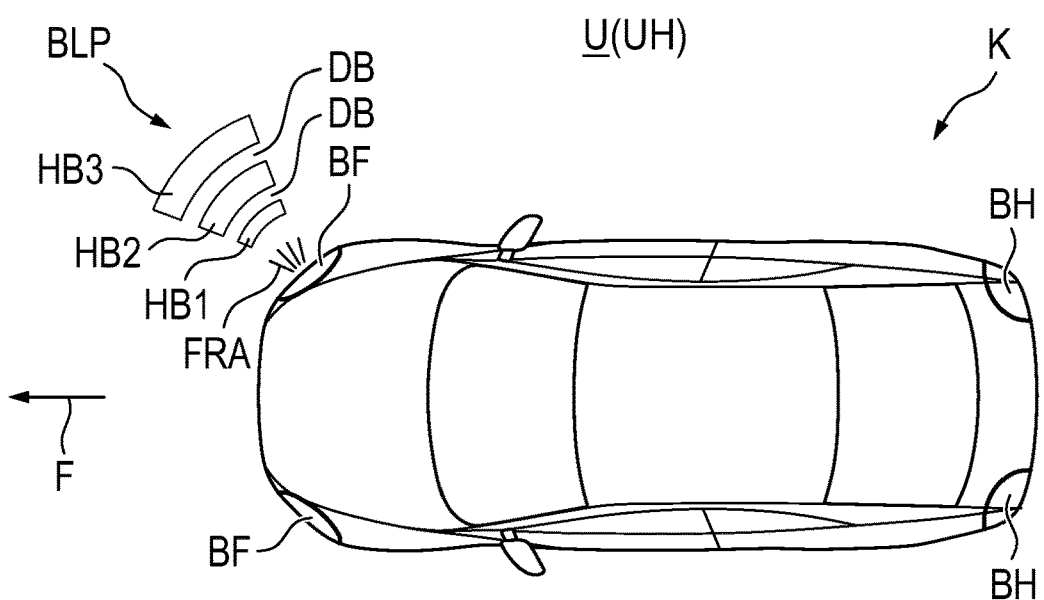

Motor vehicle K in FIG. 1B can be seen in such a state in which an actuating element for a direction indicator has been actuated and thus the light function of a direction indicator FRA has been activated.

Furthermore, it can be seen that a ground light projection BLP is additionally generated by motor vehicle K. Ground light projection BLP can be formed of a number of light areas and can have, for example, three light areas HB1 to HB3.

In the exemplary embodiment, each of the light areas HB1 to HB3 is formed as part of a circular ring, wherein the size of the light areas preferably increases continuously starting from light area HB1 to light area HB3. Dark areas DB are formed between the light areas HB1 to HB3, which are spaced apart from one another. By alternating dark and light areas, the contrast and thus the visibility of the ground light projection BLP are further improved.

Deviating from the exemplary embodiment, other shapes and/or a different number of light areas HB1 to HB3 are also conceivable.

For example, it is conceivable that multiple, for example, three, light areas are formed as quarter circles or as triangles, which are spaced apart from one another and between which, in turn, dark areas are formed. These can be arranged relative to one another so that a directional indication can be discerned from them.

Figure 1C:
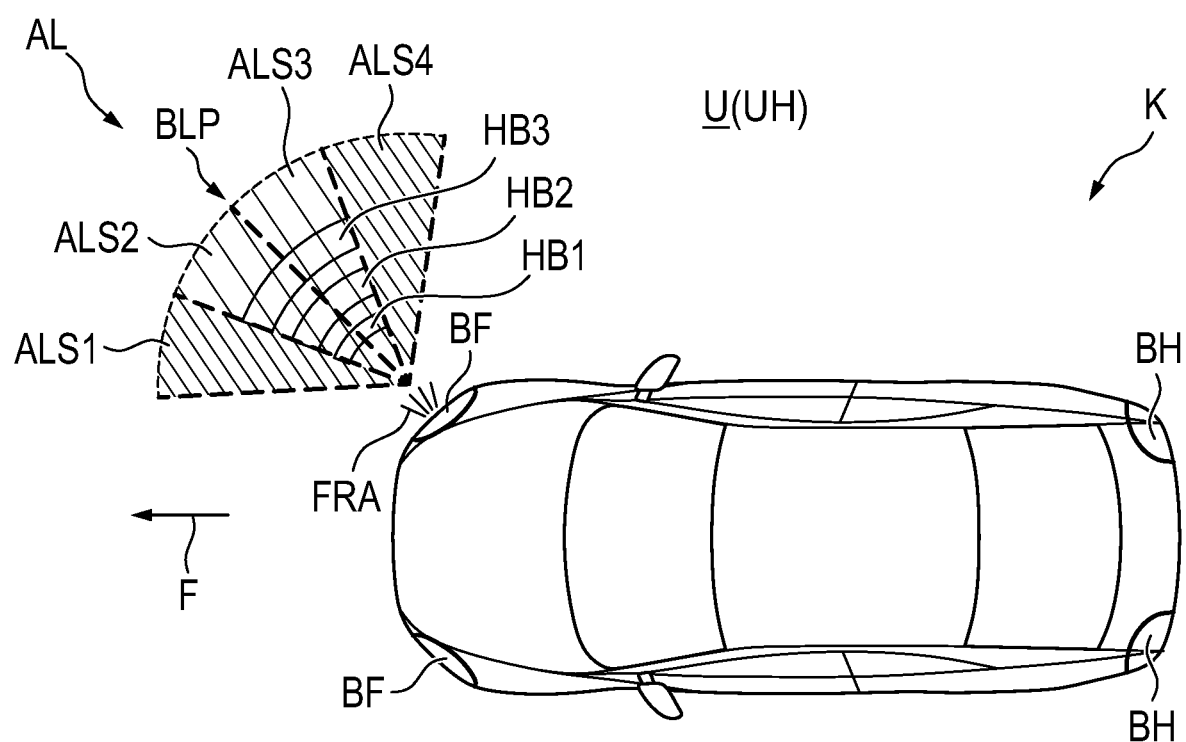
FIG. 1c is the representation of the motor vehicle from the bird's eye view, wherein the direction indicators, ground light projection, and cornering lights are activated.

Finally, motor vehicle K can be seen in FIG. 1c in such a state in which both the light function of a direction indicator FRA together with a ground light projection BLP and the light function of cornering light AL are activated. By way of example, the light functions only for a right, front lighting device BF are shown in the figures.

In this context, it should be mentioned that ground light projection BLP is a non-legally required optical support of the legally required light function of direction indicator FRA. In this case, ground light projection BLP is generated in the immediate vicinity of motor vehicle K on the side of the activated direction indicator FRA.

In the immediate vicinity, in the context of the present invention, is intended to mean that ground light projection BLP is projected on the ground at most only a few meters away from motor vehicle K.

For example, it is conceivable that ground light projection BLP is projected on the ground about 70-100 cm away, so that when turning across a bike or pedestrian path, slower road users are informed earlier about the turn.

With reference to FIG. 1c, it should be made clear further by means of wider hatching that those segments (here ALS2 and ALS3) of cornering light AL that overlap with ground light projection BLP on the ground are dimmed in their brightness to a lower brightness. In this way, the perceptibility or visibility of ground light projection BLP is to be improved despite cornering light AL being turned on.

In the exemplary embodiment, segments ALS1 and ALS4 of cornering light AL are not dimmed. However, this is also conceivable, in deviation from the exemplary embodiment.

Figure 2:
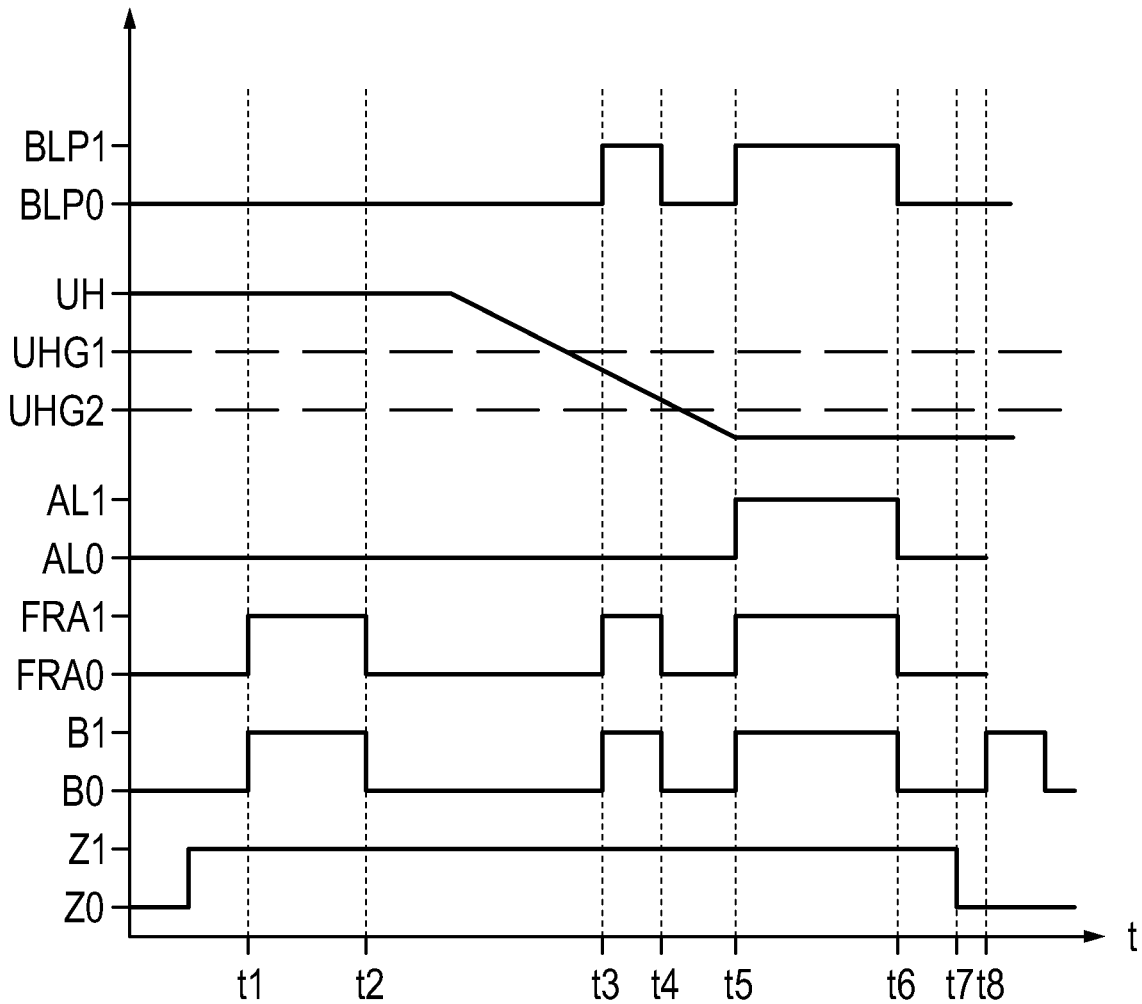
FIG. 2 shows a signal diagram for explaining one possible form of the method.

It is important to point out that ground light projection BLP is generated only when the ambient brightness U of motor vehicle K falls below a certain limit value. This will be explained in more detail with the aid of FIG. 2. In the diagram shown, a large number of variables are plotted against the time t:

Thus, an ignition of motor vehicle K is initially turned off (Z0) and is turned on at a later time (Z1).

The ambient brightness UH has a value that is above a certain or determinable first limit value UHG1 and a certain or determinable second limit value UHG2. It is assumed that the first limit value UHG1 of the ambient brightness UH corresponds to a greater brightness than the second limit value UHG2.

At a time t1, an actuating element for generating the light function of direction indicator FRA is actuated (B1), so that at this time direction indicator FRA changes from an unactuated state (FRA0=direction indicator off) to an activated state (FRA1=direction indicator on).

However, the generation of ground light projection BLP is made dependent on the undershooting of first limit value UHG1 of the ambient brightness UH due to the process or control technology.

This has the result that at time t1 ground light projection BLP is not activated (BLP0=ground light projection off).

Due to the dependence of the generation of ground light projection BLP on the ambient brightness, therefore, on the undershooting of limit value UHG1, a good perceptibility of ground light projection BLP in the case of its activation can be ensured. At time t2, direction indicator FRA is deactivated again (FRA0=direction indicator off). This may be because the steering wheel of motor vehicle K has fallen below a certain steering angle again and the actuating element has reset (B0) or because a sequential flashing function of the direction indicator has ended after a single actuation of the actuating element for the direction indicator.

At a time t3, direction indicator FRA is activated once again (FRA1) by actuating an actuating element (B1). At this time, the ambient brightness UH has already fallen below first limit value UHG1. Therefore, ground light projection BLP (cf. FIG. 1b) is also already generated at this time (BLP1=ground light projection on). Ground light projection BLP is only deactivated again (BLP0) when the light function of direction indicator FRA has also been deactivated again at a time t4 (FRA0).

At a time t5, a new activation of the light function of the direction indicator (FRA1) takes place. At this time, however, the ambient brightness UH has also fallen below the second limit value UHG2. Thus, together with the light function of direction indicator FRA, ground light projection BLP is also generated (BLP1).

The light function of cornering light AL is also linked to the ambient brightness UH. Nevertheless, the generation of cornering light AL is associated with second limit value UHG2, which is lower than the first limit value UHG1 of the ambient brightness UH.

However, because the second limit value UHG2 has already been reached or undershot at time t5, the light function of cornering light AL is activated here in addition (if the other conditions are met) (switching from AL0=cornering light off to AL1=cornering light on).

This continues until at a time t6 the light function of direction indicator FRA is deactivated again (FRA0).

At time t7, motor vehicle K is put into a nonoperational or not-ready-to-drive state by turning off the ignition of motor vehicle K again (Z0=ignition off). Equivalent to this in electric vehicles is the decoupling of a high-voltage circuit from the vehicle's traction battery.

This has the result that despite actuation of the actuating element for the direction indicator (B1) at time t8, neither the light function of direction indicator FRA nor ground light projection BLP nor cornering light AL are activated.

Figure 3:
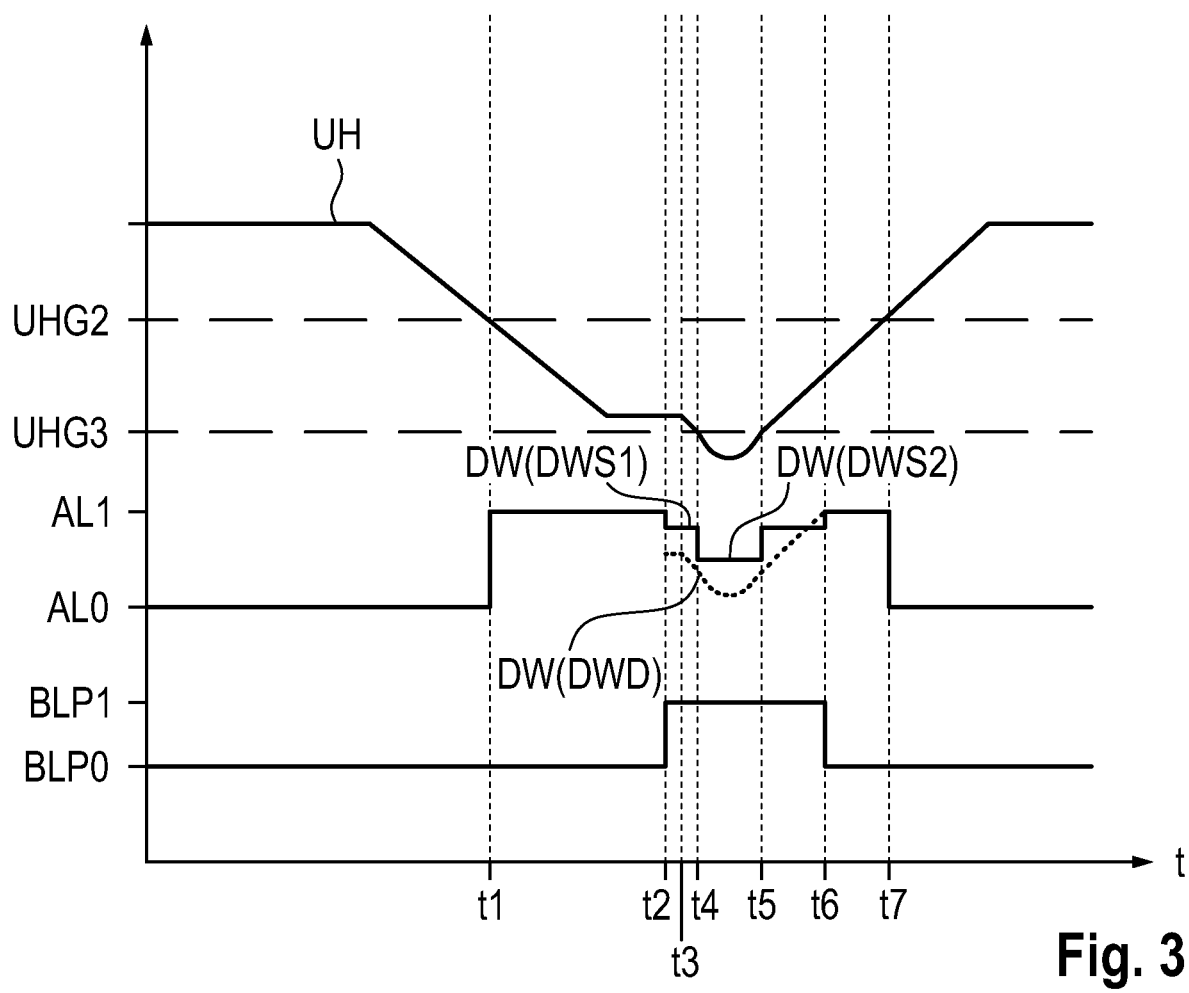
FIG. 3 shows a further signal diagram for explaining a further form of the method.

FIG. 3 is intended to illustrate how, when cornering light AL and ground light projection BLP are activated simultaneously (compare FIG. 1c), cornering light AL can be dimmed to a brightness value with a lower brightness of cornering light AL.

In this illustration, the activated cornering light (AL1) is also intended to symbolize a maximum brightness of the cornering light. If the representation of the cornering light moves in the direction of the turned-off cornering light (AL0), this is to illustrate a dimming of the brightness of cornering light AL towards a lower brightness value and vice versa.

It is assumed that at time t1 certain conditions for activating cornering light AL (for example, low vehicle speed and a certain steering angle are present) are already met. Furthermore, it can be seen that at time t1 second limit value UHG2 of the ambient brightness UH has already been reached or undershot. This has the result that cornering light AL is also activated at time t1 (AL1, also compare FIG. 1a).

It is assumed that at time t2 the conditions for generating ground light projection BLP are also present and it is activated (BLP1).

However, when cornering light AL and ground light projection BLP are activated simultaneously (also compare FIG. 1c), the brightness of cornering light AL is dimmed to ensure better visibility of ground light projection BLP. For example, it is conceivable that only the ALS2 and ALS3 that overlap with ground light projection BLP are dimmed to a lower brightness value. This is indicated in FIG. 1c by less dense hatching in these segments.

It can now be seen with reference to FIG. 3 that at time t2, when both cornering light AL and ground light projection BLP are activated (AL1 and BLP1), the brightness of cornering light AL is dimmed to a lower brightness value DW. The dimmed brightness value DW is therefore lower than the maximum possible brightness value of cornering light AL.

Two example options for dimming are shown:

First of all, it is conceivable to statically dim cornering light AL, in particular segments ALS2 and ALS3, that overlap with ground light projection BLP, to a lower brightness value (DW=DWS1).

Such dimming can also occur in multiple, for example, two, stages. Thus, it is conceivable that at time t2 cornering light AL is initially statically dimmed to a first brightness value DWS1 and that if the ambient brightness UH falls below or reaches a further, in this case third, limit value UHG3 at time t4, further dimming DW to an even lower brightness value DWS2 takes place. The third (preferably also determinable) limit value UHG3 corresponds to an even lower ambient brightness UH than second limit value UHG2.

For example, it is conceivable that second limit value UHG2 is formed by an onset of dusk and third limit value UHG3 by nightfall.

In other words, cornering light AL is initially dimmed to the first, dimmed brightness value DWS1 at time t2 and is lowered even further to the second, lower brightness value DWS2 at time t4 when the ambient brightness UH becomes darker, specifically when the brightness falls below the limit value UHG3. Similarly, at a time t5 when the limit value UHG3 is reached again, the brightness value DW is raised again to the higher, first brightness value DWS1.

At time t6, when ground light projection BLP is deactivated (BLP0), cornering light AL is raised again to the maximum brightness (AL1) if other conditions are present. However, if at time t7 a condition for generating cornering light AL ceases to apply (in this case exceeding the second limit value UHG2 of the ambient brightness UH), cornering light AL is also deactivated again (AL0).

As an alternative to the static setting of a dimmed brightness value, it is also conceivable to adapt the dimmed brightness value DW dynamically, therefore, continuously, to the ambient brightness UH.

This requires a higher control effort and is indicated by the dotted line, which is intended to show the possible course of a dynamically set, dimmed brightness value DWD.

Thus, at a time t3 the course of the ambient brightness UH shows a further decrease. At the same time, the brightness value DWD is also shifted downwards towards a lower brightness, analogous to the course of the ambient brightness UH. The course of the brightness value DWD is tracked analogously to the course of the ambient brightness UH until at a time t6 ground light projection BLP ceases and thus the maximum brightness of the cornering light (AU) is generated again. Only when the limit value UHG2 of the ambient brightness UH is reached or exceeded is the cornering light AL also deactivated (AL0).

In this way, when cornering light AL and ground light projection BLP are turned on simultaneously, the perceptibility or visibility of ground light projection BLP can be significantly improved by static or also dynamic dimming of cornering light AL.

Figure 4:
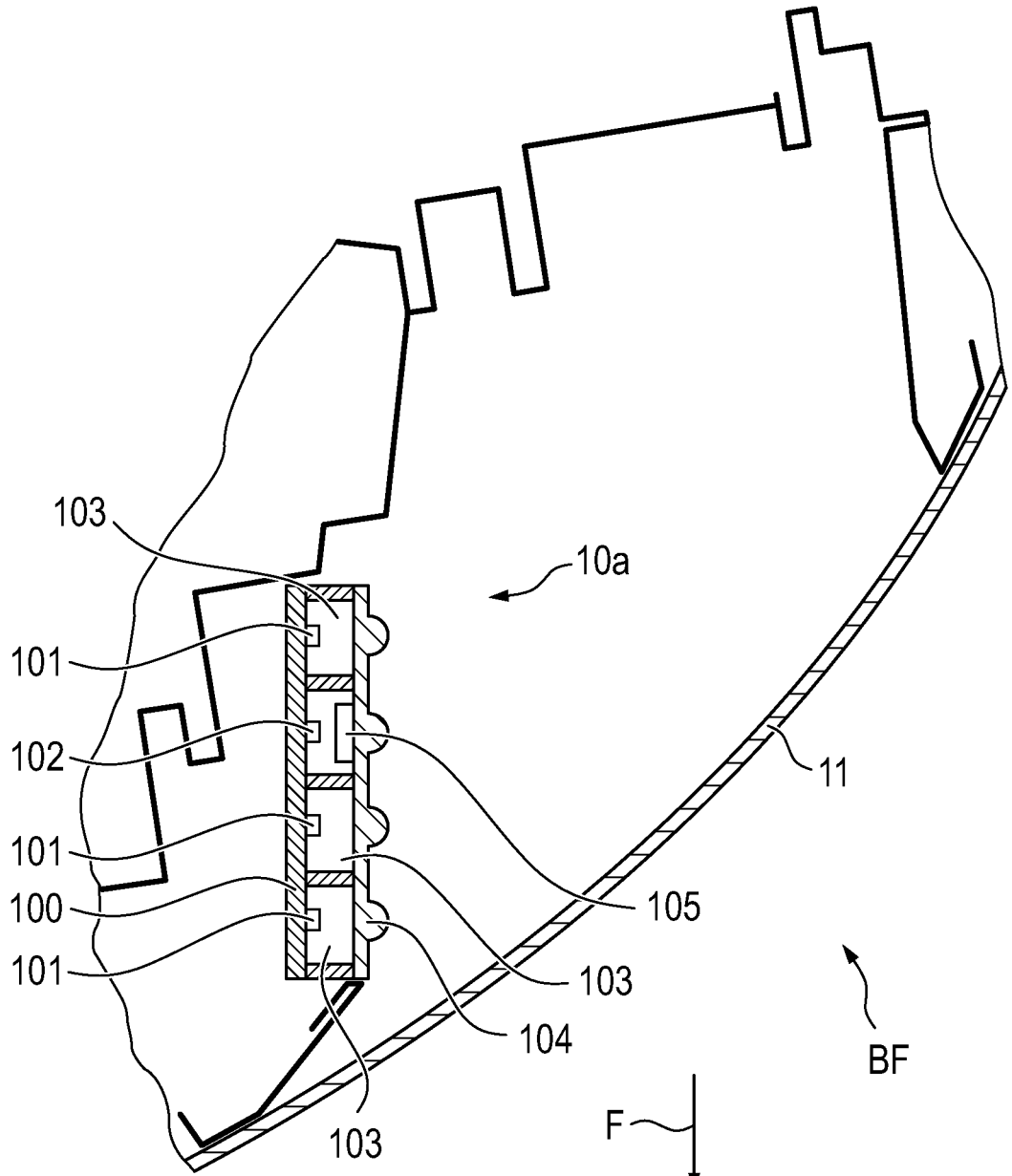
FIG. 4 shows a lighting device for generating a cornering light and a ground light projection.

FIG. 4 now shows a lighting device 10a by which a light module that can be mounted in a compact manner is formed. Lighting device 10a comprises a circuit board 100 on which a plurality of light-emitting diodes 101 for generating cornering light AL and at least one light-emitting diode 102 for generating ground light projection BLP are provided. Light-emitting diodes 101 preferably emit white light, whereas light-emitting diode 102 preferably emits yellow light. Light-emitting diodes 101, 102 are separated from one another in a light-tight manner by a housing structure in such a way that a number of light chambers 103 are formed. In one light emission direction, light chambers 103 are covered by lenses 104 or comparable optical elements. Segments of cornering light AL can be generated by light chambers 103 with light-emitting diodes 101. For this purpose, appropriate sequential control of light-emitting diodes 101 is necessary. For example, it is conceivable to make the activation of the individual segments ALS1 to ALS4 (compare FIG. 1a) dependent on a detected steering angle sensor. Light chamber 103 with light-emitting diode 102 also comprises a projection unit 105, which is used to generate ground light projection BLP.

Projection unit 105 can be formed, e.g., by a so-called graphical optical blackout (Gobo), wherein the projection occurs similar to a slide projection or as a shadow projection. Projection unit 105 can also be embodied as a micro-lens array (MLA). The use of a dynamic imager (translucent LCD element) is also conceivable.

Lighting device 10a is preferably arranged and mounted in the housing of the front lighting devices BF, wherein the position of lighting device 10a in the housing is preferably positioned further towards the center, therefore, towards a radiator grille of motor vehicle K than the light for the low beam and high beam. In the present exemplary embodiments (FIGS. 5 to 7), the front lighting device BF is the left, front headlight as seen in the direction of travel. This is covered at the front in the direction of travel F by a light cover 11.

Figure 5:
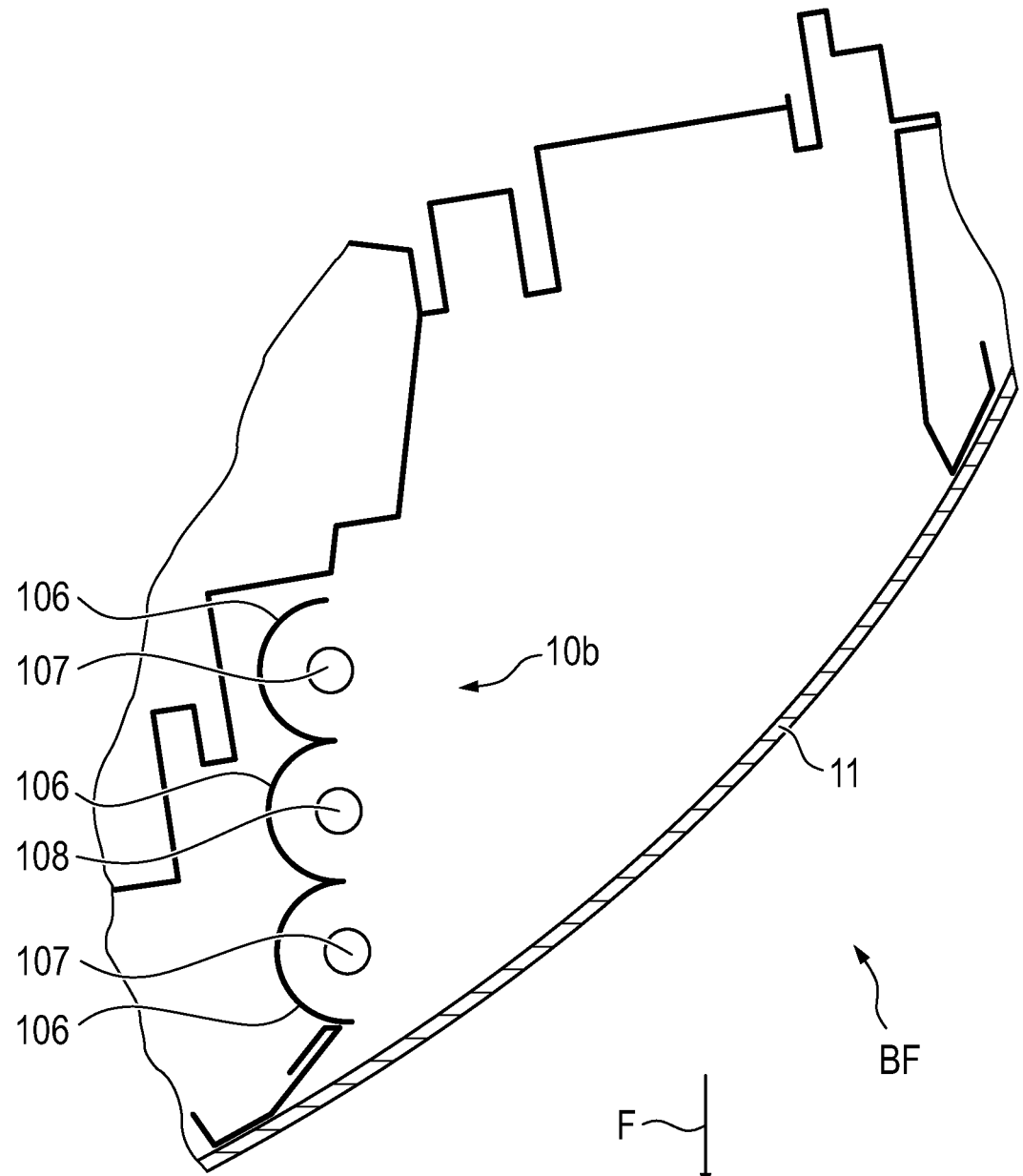
FIG. 5 shows a lighting device for generating a cornering light and a ground light projection.

FIG. 5 shows a further variant of lighting device 10b, which is installed in the housing of the front lighting device BF analogously to the previous figure.

In contrast to lighting device 10a, lighting device 10b has a plurality of light sources 107 for generating a white cornering light AL and a light source 108 for generating the yellow ground light projection BLP. Reflectors 106 are associated with each of light sources 107 and 108. Reflectors 106 are preferably formed as free-form reflectors with which the light beams generated by light sources 107, 108 can be reflected precisely in the desired directions.

Figure 6:
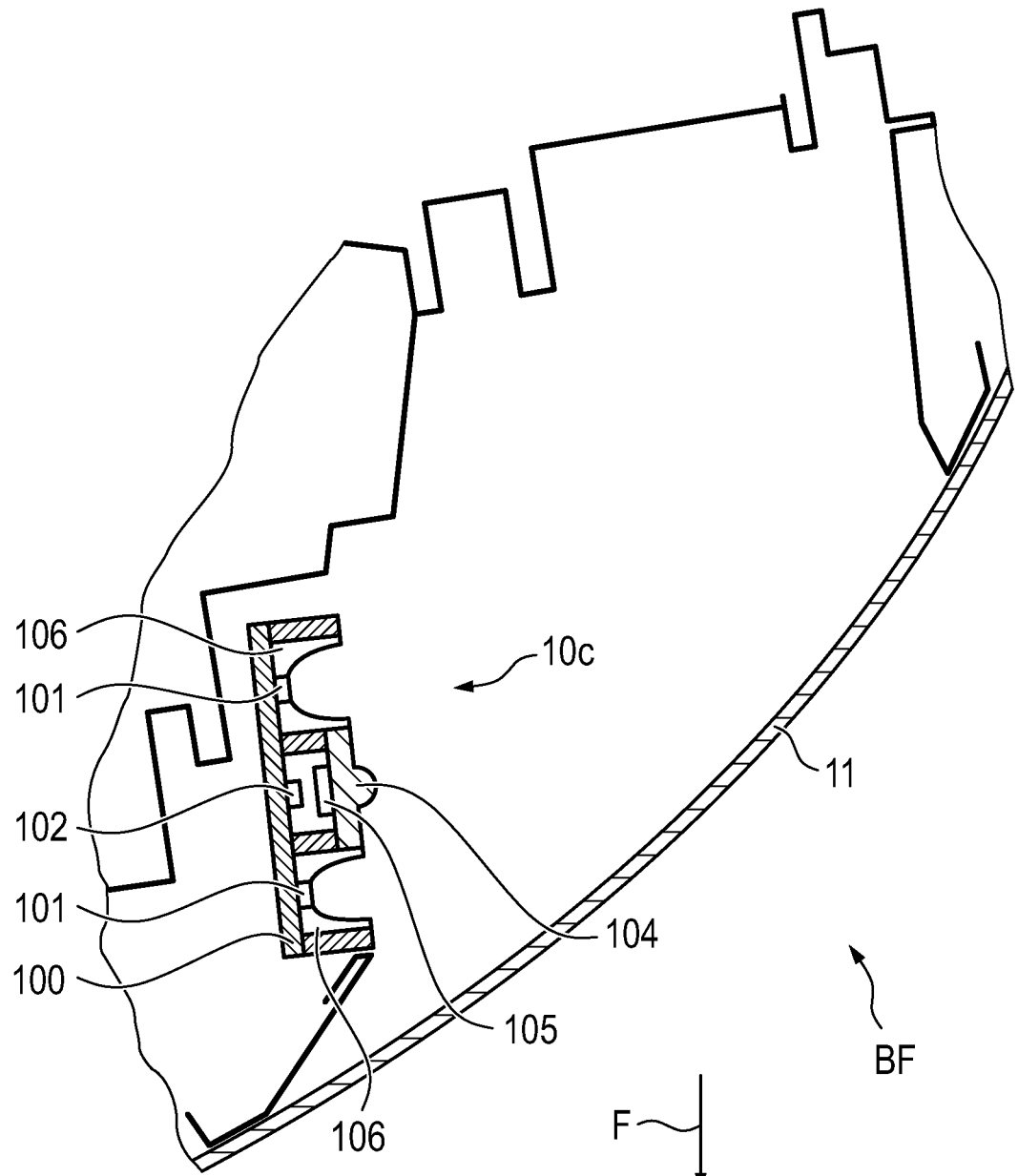
FIG. 6 shows a lighting device for generating a cornering light and a ground light projection.

Finally, FIG. 6 shows a lighting device 10c formed by a combination of the solutions shown in the previous two figures. Thus, a circuit board 100 is provided on which light-emitting diodes 101 emitting white light and one light-emitting diode 102 emitting yellow light are arranged. Light-emitting diodes 101 are each assigned a reflector 106, which is preferably formed as a free-form reflector. Light-emitting diode 102 is in turn part of a projection unit 105, with a downstream lens 104 as the end optics.

Deviating from the exemplary embodiment, it is also conceivable that lighting devices 10a to 10c are not installed in the housing of front lighting device BF, but separately therefrom as independent light modules on motor vehicle K.

Figure 7:
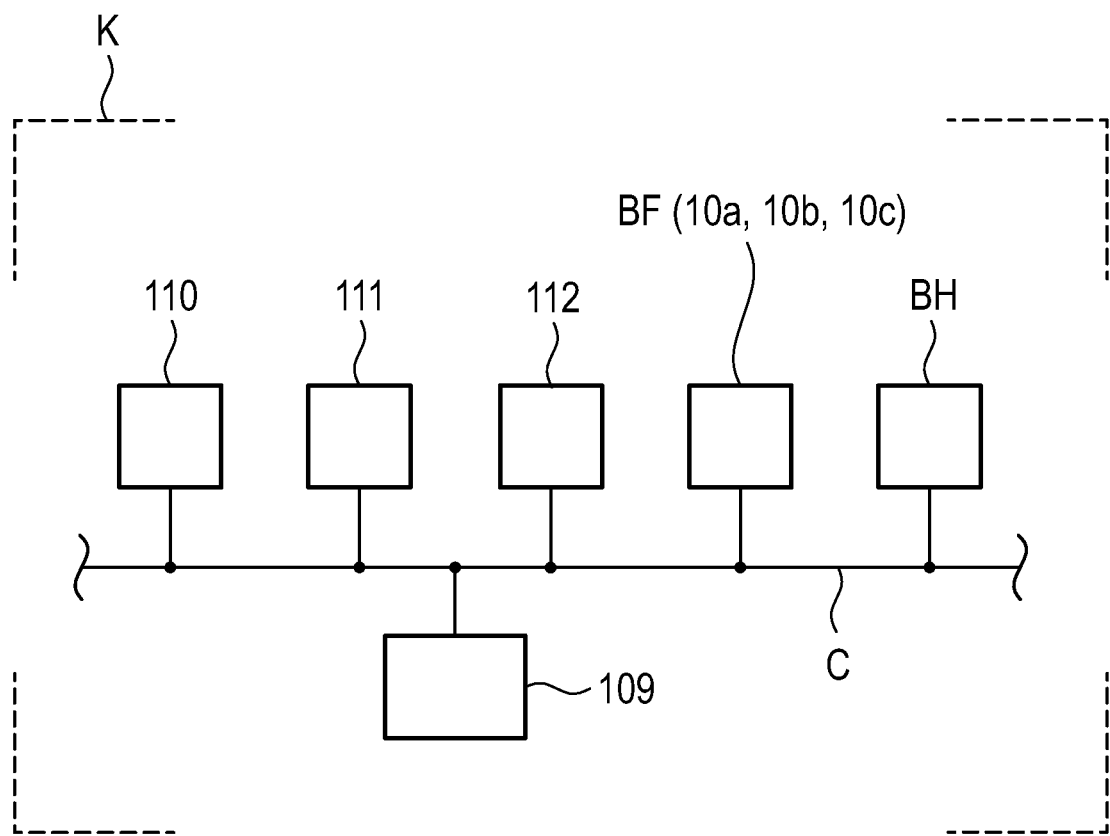
FIG. 7 shows a signal flow diagram for explaining the signaling connection between motor vehicle components involved in the method.

Finally, FIG. 7 shows how the components that are essential for understanding the invention are interconnected in terms of signaling.

Thus, a light sensor 110 can be seen, which is preferably designed as a rain/light sensor of motor vehicle K. Light sensor 110 is used to detect the ambient brightness UH of the surroundings U (compare FIGS. 1a to 1c).

Furthermore, an input and display device 111 can be seen, which can preferably be designed as a touch-sensitive touchscreen. For example, input and display device 111 may be used to carry out user-preferred settings. Via input and display device 111, the user can, for example, define the aforementioned limit values UHG1 to UHG3 of the ambient brightness UH and/or the level of the statically dimmed brightness values DWS1, DWS2 (cf. FIG. 3).

Furthermore, an actuating element 112 is shown, which is used for user actuation of direction indicator FRA. Actuating element 112 can preferably be formed as an actuating lever on the steering column of motor vehicle K. Finally, there is an evaluation and control device 109 which detects and evaluates the signals generated by said components. Depending on the detected signals, evaluation and control device 109 controls both front lighting devices BF or lighting devices 10a, 10b or 10c located therein and, analogously, rear lighting devices BH. Said components are connected to one another in terms of signaling via a data bus C, which can preferably be designed as a CAN bus.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for generating a light function of a direction indicator in a motor vehicle, the method comprising:
   activating the light function of the direction indicator when the motor vehicle is in an operational state and an actuating element is actuated in the motor vehicle; and
   generating, in addition to the generation of the light function of the direction indicator, a ground light projection in an immediate vicinity of the motor vehicle, the ground light projection being generated only when an ambient brightness of the motor vehicle falls below a limit value.

2. The method according to claim 1, wherein the limit value of the ambient brightness for generating the ground light projection differs from a limit value of the ambient brightness for generating the light function of a cornering light.

3. The method according to claim 2, wherein the limit value for generating the ground light projection corresponds to a higher ambient brightness than a limit value for generating the light function of the cornering light.

4. The method according to claim 1, wherein the ground light projection is a defined graphic pattern formed by flat, light areas with a defined outline, which are spaced apart from one another by at least one dark area.

5. The method according to claim 2, wherein, when the light function of the cornering light and the ground light projection are generated substantially simultaneously, at least one part of the cornering light, said part overlapping with the ground light projection, is statically dimmed to a brightness value with a lower brightness.

6. The method according to claim 2, wherein, when the light function of the cornering light and the ground light projection are generated substantially simultaneously, at least one part of the cornering light, said part overlapping with the ground light projection, is dimmed to a brightness value with a lower brightness such that the brightness value is adjusted to the ambient brightness.

7. The method according to claim 6, wherein the brightness value is continuously adapted to the ambient brightness.

8. The method according to claim 6, wherein the brightness value is adapted to the ambient brightness such that when a first limit value of the ambient brightness is reached, the brightness value is set to a first value and when a second, lower limit value of the ambient brightness is reached, the brightness value is set to a second value, and wherein the second brightness value is lower than the first brightness value.

9. The method according to claim 1, wherein the ground light projection is dynamically built up from an initial state to a final state, and wherein a brightness of the ground light projection is increased continuously, starting from an initial value at the time of the initial state to a maximum of the brightness at the time of the final state.

10. A motor vehicle for carrying out the method according to claim 1, the motor vehicle comprising:
- a front lighting device and a rear lighting devices, the lighting devices adapted to generate a light function of a direction indicator, the light function of the direction indicator being generated by actuating an actuating element;
- a cornering lighting device to generate a light function of a cornering light;
- at least one light sensor operationally connectable to the cornering lighting device to generate a light function of the cornering light;
- at least one ground lighting device to generating a ground light projection, the at least one ground lighting device for generating the ground light projection is operationally connectable to the at least one light sensor;
- a control and evaluation device to evaluate signals from the at least one light sensor, via which the ground lighting device for generating the ground light projection and the cornering lighting device for generating the light function of the cornering light is controlled as a function of the signals from the at least one light sensor.

* * * * *